United States Patent Office 2,744,141
Patented May 1, 1956

2,744,141

METHOD OF PREPARING SATURATED ALIPHATIC BETA-SECONDARY- AND TERTIARY-AMINO ALCOHOLS

Kenyon J. Hayes and Gordon D. Drake, Norwich, N. Y., assignors, by mesne assignments, to The Norwich Pharmacal Company, Norwich, N. Y., a corporation of New York No Drawing. Application June 26, 1951,
Serial No. 233,682

6 Claims. (Cl. 260—584)

This invention relates to the preparation of amino alcohols and aims to provide an improved method of preparing saturated aliphatic beta-secondary- and tertiary-amino alcohols.

It has been customary in the past to prepare saturated aliphatic amino alcohols from the corresponding amino aldehyde by the "Mannich" process (see U. S. Patents Nos. 1,824,676 and 1,889,678). The preparation of the aldehydes is known (see U. S. Patent No. 1,824,676). Reduction of such aldehydes to the corresponding amino alcohol by the Mannich process has proven in practice to be very cumbersome. We have discovered that certain saturated aliphatic amino alcohols can be prepared much more economically from the corresponding amino aldehyde through the use of an aluminum alkoxide in alcohol. The method which we have discovered can be employed with particular advantage in the production of saturated aliphatic beta-tertiary-amino alcohols. It may also be practiced with advantage, however, in the preparation of saturated aliphatic beta-secondary-amino alcohols.

In accordance with our invention, an aliphatic saturated beta-secondary- or tertiary-amino alcohol of the general formula:

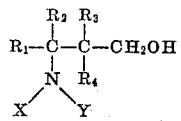

in which:

$R_1$ is a member of the group consisting of H and lower alkyl $R_2$ is a member of the group consisting of H and lower alkyl $R_3$ is a member of the group consisting of H and lower alkyl $R_4$ is a member of the group consisting of H and lower alkyl X is a member of the group consisting of H and lower alkyl Y represents lower alkyl is prepared through the reduction of the corresponding aldehyde in the presence of aluminum isopropoxide in isopropanol.

In order that our invention may be fully understood by those skilled in the art, we will described specific examples illustrative of the practice thereof:

EXAMPLE 1

*2,2-dimethyl-3-diethylamino-1-propanol*

11.6 g. (0.074 mole) of 2,2-dimethyl-3-diethylaminopropionaldehyde of B. P. 118°–123° (103–104 mm.) and 15.1 g. (3 equivalents) of freshly prepared, crude aluminum isopropoxide in 118 ml. of anhydrous isopropanol were slowly distilled to remove the acetone formed. An electrically-heated, 45-cm. column packed with glass helices was used to effect the separation. After 145 minutes the acetone test was negative. The brown reaction mixture was reduced to one-third the original volume by distillation at 100 mm., and the residue was shaken with five volumes of cold 10% sodium hydroxide solution. The crude amino alcohol, which appeared as an oily layer, was separated and the aqueous portion was extracted with ether. The ether extract and the crude oil were combined, dried with potassium hydroxide pellets, and fractionally distilled (Vigreux column) in vacuo. The 2,2-dimethyl-3-diethylamino-1-propanol was obtained as a colorless liquid of B. P. 90.0°–90.5° (12 mm.) 10.0 g. (84.7%).

EXAMPLE 2

*2-dimethylaminomethyl-3-methyl-1-butanol*

This amino alcohol was prepared by following the procedure described in Example 1 starting with 2-isopropyl-3-dimethylaminopropionaldehyde of B. P. 57°–58° (11 mm.). Fifteen grams (0.105 mole) of the amino aldehyde, 22.4 g. of distilled aluminum isopropoxide, and 115 g. of isopropanol were fractionally distilled for 80 minutes to remove acetone. Proceeding as described in Example 1 above, there were obtained 10.1 g. (66.3%) of amino alcohol of B. P. 82.0°–83.5° (14–15 mm.).

EXAMPLE 3

*2,2-dimethyl-3-methylamino-1-propanol*

Twenty grams (0.174 mole) of 2,2-dimethyl-3-methylaminopropionaldehyde of B. P. 48.0°–50.5° (12–13 mm.) were reduced with three equivalents of distilled aluminum isopropoxide in accordance with the method described above in Example 1. Acetone was produced continuously but considerable quantities of some volatile amine were evolved. At the end of 125 minutes a 27% yield of crude amino alcohol of B. P. 68°–90° (9–11 mm.) was obtained.

What is claimed is:

1. The method of preparing a saturated aliphatic beta-amino alcohol of the general formula:

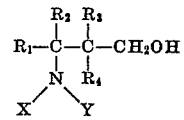

in which:

$R_1$ is a member of the group consisting of H and lower alkyl $R_2$ is a member of the group consisting of H and lower alkyl $R_3$ is a member of the group consisting of H and lower alkyl $R_4$ is a member of the group consisting of H and lower alkyl X is a member of the group consisting of H and lower alkyl Y represents lower alkyl which comprises reducing a corresponding amino aldehyde of the general formula:

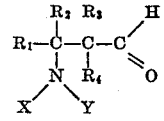

in which:

$R_1$ is a member of the group consisting of H and lower alkyl $R_2$ is a member of the group consisting of H and lower alkyl R₃ is a member of the group consisting of H and lower alkyl R₄ is a member of the group consisting of H and lower alkyl X is a member of the group consisting of H and lower alkyl Y represents lower alkyl with aluminum isopropoxide in isopropanol at reflux temperature.

2. The method of preparing an amino alcohol according to claim 1 in which said amino alcohol is a saturated aliphatic beta-secondary-amino alcohol.

3. The method of preparing an amino alcohol according to claim 1 in which said amino alcohol is a saturated aliphatic beta-tertiary-amino alcohol.

4. The method of preparing 2,2-dimethyl-3-diethylamino-1-propanol which comprises reducing 2,2-dimethyl-3-diethylaminopropionaldehyde with aluminum isopropoxide in isopropanol at reflux temperature.

5. The method of preparing 2-dimethylamino-methyl-3-methyl-1-butanol which comprises reducing 2-isopropyl-3-dimethylaminopropionaldehyde with aluminum isopropoxide in isopropanol at reflux temperature.

6. The method of preparing 2,2-dimethyl-3-methylamino-1-propanol which comprises reducing 2,2-dimethyl-3-methylaminopropionaldehyde with aluminum isopropoxide in isopropanol at reflux temperature.

References Cited in the file of this patent

UNITED STATES PATENTS

| 1,889,678 | Mannich | Nov. 29, 1932 |
| 2,394,848 | Doumani | Feb. 12, 1946 |
| 2,464,199 | Elderfield et al. | Mar. 15, 1949 |

OTHER REFERENCES

Fuson et al.: "Org. Chem." (1947), p. 310.